(12) United States Patent
Guo et al.

(10) Patent No.: US 11,720,209 B2
(45) Date of Patent: Aug. 8, 2023

(54) PRESSURE DETECTION APPARATUS, SCREEN ASSEMBLY, AND MOBILE TERMINAL

(71) Applicant: VIVO MOBILE COMMUNICATION CO., LTD., Guangdong (CN)

(72) Inventors: Yang Guo, Chang'an Dongguan (CN); Kui Li, Chang'an Dongguan (CN); Changhong Xie, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 29 days.

(21) Appl. No.: 17/347,381

(22) Filed: Jun. 14, 2021

(65) Prior Publication Data
US 2021/0303102 A1 Sep. 30, 2021

Related U.S. Application Data

(63) Continuation of application No. PCT/CN2019/117448, filed on Nov. 12, 2019.

(30) Foreign Application Priority Data

Dec. 18, 2018 (CN) .......................... 201811548465.5

(51) Int. Cl.
*G06F 3/042* (2006.01)
*G02B 5/20* (2006.01)
(Continued)

(52) U.S. Cl.
CPC ........... *G06F 3/0421* (2013.01); *G02B 5/208* (2013.01); *G06F 3/041* (2013.01); *G06F 3/0414* (2013.01);
(Continued)

(58) Field of Classification Search
CPC ...... G06F 3/0421; G06F 3/041; G06F 3/0414; G06F 2203/04106; G06F 3/042;
(Continued)

(56) References Cited

U.S. PATENT DOCUMENTS

2004/0135942 A1 7/2004 Lee et al.
2009/0161051 A1 6/2009 Fukunaga et al.
(Continued)

FOREIGN PATENT DOCUMENTS

CN 101082406 A * 12/2007 ........... G02B 6/0053
CN 102609138 A 7/2012
(Continued)

OTHER PUBLICATIONS

Machine translation of JP2016161926A (Year: 2016).*
(Continued)

*Primary Examiner* — Patrick N Edouard
*Assistant Examiner* — Joseph P Fox
(74) *Attorney, Agent, or Firm* — Maschoff Brennan

(57) ABSTRACT

A pressure detection apparatus includes a substrate, a light conducting layer, a light absorbing layer, and a photosensitive layer that are arranged in order, and further includes a light source. The light source is capable of emitting light of a first frequency, and an emergent surface of the light source faces toward the light conducting layer. The light conducting layer disperses the light of the first frequency. The light absorbing layer includes a container forming a closed space and an absorption liquid filling the container, where the absorption liquid absorbs at least a part of the light of the first frequency, and at least one side surface of the container is an elastic surface. A photosensitive surface of the photosensitive layer faces toward the light absorbing layer, and the photosensitive layer is used to detect the light of the first frequency that passes through the light absorbing layer.

20 Claims, 8 Drawing Sheets

(51) Int. Cl.
*G06F 3/041* (2006.01)
*H04M 1/02* (2006.01)

(52) U.S. Cl.
CPC . *H04M 1/0266* (2013.01); *G06F 2203/04106* (2013.01)

(58) Field of Classification Search
CPC ........ G02B 5/208; G02B 5/20; G02B 6/0053; G02B 6/0055; G02B 6/0056; H04M 1/0266; H04M 2250/22
See application file for complete search history.

(56) References Cited

U.S. PATENT DOCUMENTS

| | | |
|---|---|---|
| 2010/0103140 A1 | 4/2010 | Hansson |
| 2012/0200532 A1 | 8/2012 | Powell et al. |
| 2018/0031745 A1 | 2/2018 | Kim et al. |
| 2018/0164927 A1* | 6/2018 | Gu .................... G02B 5/285 |
| 2021/0208438 A1 | 7/2021 | NI et al. |

FOREIGN PATENT DOCUMENTS

| | | | |
|---|---|---|---|
| CN | 106445242 A | 2/2017 | |
| CN | 107135304 A | 9/2017 | |
| CN | 109739378 A | 5/2019 | |
| JP | 2004220031 A | 8/2004 | |
| JP | 2009151039 A | 7/2009 | |
| JP | 2011007557 A | 1/2011 | |
| JP | 2016161926 A * | 9/2016 | ............... G02B 5/20 |
| WO | 2018/176920 A1 | 10/2018 | |

OTHER PUBLICATIONS

Machine translation of CN101082406A (Year: 2007).*
Google dictionary definition of Absorb (Year: 2023).*
Written Opinion of the International Searching Authority dated Jan. 23, 2020 as received in Application No. PCT/CN2019/117448.
Extended European Search Report from corresponding EP Application No. 19897576.5, dated Jan. 13, 2022.
JP Office Action in Application No. 2021-535026 dated Aug. 2, 2022.

* cited by examiner

PRESSURE DETECTION APPARATUS, SCREEN ASSEMBLY, AND MOBILE TERMINAL

CROSS-REFERENCE TO RELATED APPLICATIONS

This application is a continuation application of International Application No. PCT/CN2019/117448 filed on Nov. 12, 2019, which claims priority to Chinese Patent Application No. 201811548465.5, filed in China on Dec. 18, 2018, both disclosures of which are incorporated herein by reference in their entireties.

TECHNICAL FIELD

This disclosure relates to the field of electronic technologies, and in particular, to a pressure detection apparatus, a screen assembly, and a mobile terminal.

BACKGROUND

With the rapid development of electronic technologies and multimedia information technologies, many kinds of electronic products frequently used in work and life, such as computers (for example, tablet computers), mobile phones, and car navigators, have begun to use touchscreens instead of traditional keyboards and mouse devices to complete input control. Touchscreen technologies simplify the way people operate electronic products, and provide better user experience.

For a touchscreen featuring mainly infrared touch, infrared emission and reception matrices can be provided in the X and Y directions of the screen, so that infrared light can be constantly emitted to scan the screen. When a user presses the touchscreen with a finger, the infrared light is blocked at a position pressed by the finger, making a receiving end unable to receive the infrared light. In this case, a controller may obtain coordinates of a position at which infrared light transmission is interrupted, through detection for the infrared light in the X and Y directions, thereby determining the position pressed by the user finger.

However, the infrared light is prone to produce reflection and refraction of stray light and other problems during use of the touchscreen featuring mainly infrared touch. As a result, the touchscreen is not sensitive to the user's operation, bringing poor user experience.

SUMMARY

A purpose of embodiments of this disclosure is to provide a pressure detection apparatus, a screen assembly, and a mobile terminal, so as to resolve problems of low flexibility of touchscreens and poor user experience in the related art.

To resolve the foregoing technical problems, the embodiments of this disclosure are implemented as follows:

According to a first aspect, an embodiment of this disclosure provides a pressure detection apparatus, where the pressure detection apparatus includes a substrate, a light conducting layer, a light absorbing layer, and a photosensitive layer that are arranged in order, and further includes a light source, where the light source is capable of emitting light of a first frequency, and an emergent surface of the light source faces toward the light conducting layer;

the light conducting layer disperses the light of the first frequency;

the light absorbing layer includes a container forming a closed space and an absorption liquid filling the container, where the absorption liquid absorbs at least a part of the light of the first frequency, and at least one side surface of the container is an elastic surface; and a photosensitive surface of the photosensitive layer faces toward the light absorbing layer, and the photosensitive layer is used to detect the light of the first frequency that passes through the light absorbing layer.

Optionally, the light conducting layer includes a reflective plate and a light guide plate, where the reflective plate and the light guide plate are arranged in order, and the reflective plate is provided on a side surface of the substrate.

Optionally, the pressure detection apparatus further includes a light shielding layer, where the light shielding layer is provided on a back side of a photosensitive surface of the photosensitive layer.

Optionally, the pressure detection apparatus further includes a light processing assembly, where the light processing assembly includes a refractive plate and a polarizing plate, and the refractive plate and the polarizing plate are adjacent to each other and are provided between the light conducting layer and the light absorbing layer.

Optionally, a side surface of the container facing toward the light absorbing layer is an elastic surface, and a side surface of the container facing toward the light source is an inelastic surface.

Optionally, a light transmittance of the container is higher than a predetermined light transmittance threshold.

Optionally, the absorption liquid is used to absorb the light of the first frequency, and an absorbed amount of the light of the first frequency by the absorption liquid is positively correlated with a distance that the light of the first frequency passes through the absorption liquid.

Optionally, a detector and a plurality of photosensitive blocks are provided on the photosensitive layer, the plurality of photosensitive blocks are separately connected to the detector, the photosensitive block is configured to detect light intensity of the light of the first frequency and convert the detected light intensity into a current, and the detector is configured to determine, based on changes of the current, positions of the photosensitive blocks corresponding to light intensity changes.

Optionally, the light shielding layer is used to block light in a predetermined frequency range from passing through.

Optionally, the light shielding layer includes a base film and a reflection increasing film, a refractive index of the reflection increasing film is greater than that of the base film, a thickness of the reflection increasing film falls within a predetermined thickness range, the base film is provided above the photosensitive layer, and the reflection increasing film is provided above the base film.

Optionally, a thickness of the reflection increasing film is an odd multiple of $$\frac{c}{4f_0 n_1}.$$

According to a second aspect, an embodiment of this disclosure provides a screen assembly, including the pressure detection apparatus according to the first aspect, where the pressure detection apparatus includes at least two light sources, and at least one of the at least two light sources is capable of emitting light of a first frequency.

Optionally, the pressure detection apparatus includes a first light source and a second light source, where the first light source is configured to emit visible light, and the second light source is configured to emit invisible light of the first frequency.

According to a third aspect, an embodiment of this disclosure provides a mobile terminal, including the screen assembly according to the second aspect.

It can be learned from the embodiments of this disclosure that, the pressure detection apparatus provided in the embodiments of this disclosure includes the substrate, the light conducting layer, the light absorbing layer, and the photosensitive layer that are arranged in order, and further includes the light source. The light source is capable of emitting the light of the first frequency, and the emergent surface of the light source faces toward the light conducting layer. The light conducting layer disperses the light of the first frequency. The light absorbing layer includes the container forming a closed space and the absorption liquid filling the container, where the absorption liquid absorbs at least a part of the light of the first frequency, and at least one side surface of the container is an elastic surface. The photosensitive surface of the photosensitive layer faces toward the light absorbing layer, and the photosensitive layer is used to detect the light of the first frequency that passes through the light absorbing layer. In this way, based on the structure of the above-mentioned pressure detection apparatus, the light from the light source can be dispersed by using the light conducting layer, and the structure of the container and the absorption liquid on the light absorbing layer can improve sensitivity of light-based pressure detection and improve user experience while ensuring the detection accuracy.

BRIEF DESCRIPTION OF DRAWINGS

To describe the technical solutions in the embodiments of this disclosure or in the related art more clearly, the following briefly describes the accompanying drawings required for describing the embodiments or the related art. Apparently, the accompanying drawings in the following description show merely some embodiments described in this disclosure, and a person of ordinary skill in the art may still derive other drawings from these accompanying drawings without creative efforts.

REFERENCE SIGNS

100—light source, 200—substrate, 300—light conducting layer, 301—light guide plate, 302—reflective plate, 400—light processing assembly, 401—refractive plate, 402—polarizing plate, 500—light absorbing layer, 501—container, 5011—elastic surface of the container, 502—absorption liquid, 600—photosensitive layer, 601—photosensitive block, 602—detector, 700—light shielding layer, 701—reflection increasing film, 702—base film.

DESCRIPTION OF EMBODIMENTS

The embodiments of this disclosure provide a pressure detection apparatus, a screen assembly, and a mobile terminal.

To make a person skilled in the art understand the technical solutions in this disclosure better, the following clearly and completely describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

Embodiment 1

Figure 1:
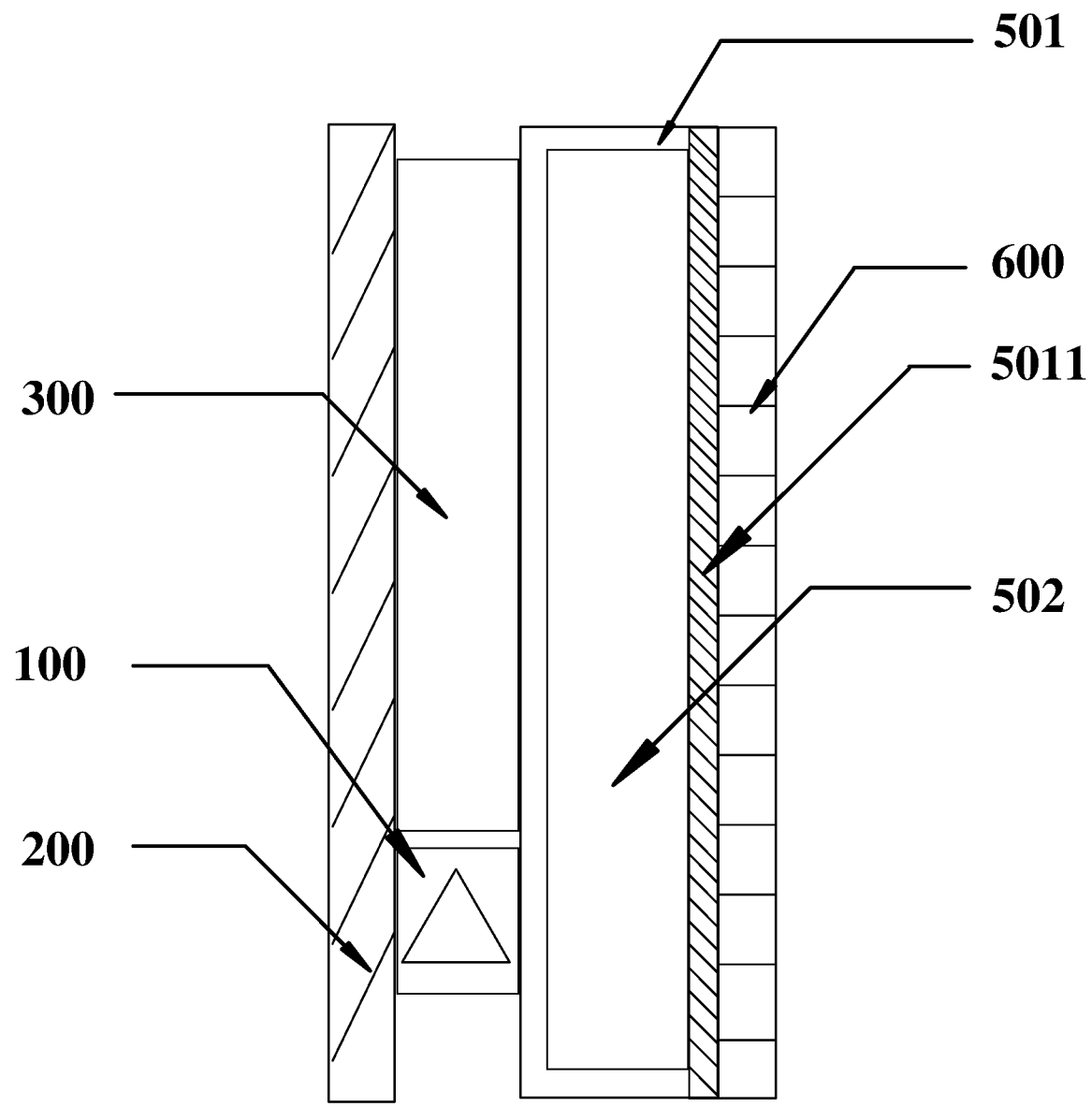
FIG. 1 is a schematic structural diagram of a pressure detection apparatus according to this application.

An embodiment of this disclosure provides a pressure detection apparatus, as shown in FIG. 1. The pressure detection apparatus includes a substrate 200, a light conducting layer 300, a light absorbing layer 500, and a photosensitive layer 600 that are arranged in order, and further includes a light source 100.

The substrate 200 is located at the lowermost layer of the pressure detection apparatus, and may be configured for carrying, fastening, power supply, control, or the like. The substrate 200 may be a glass plate, a metal plate, or a plastic plate, which is not limited in this embodiment of this disclosure.

The light source 100 may be provided on the outside of the light conducting layer 300, and an emergent surface of the light source 100 faces toward the light conducting layer 300. The light source 100 may include a plurality of white light sources and a plurality of infrared light sources. The light source 100 may emit both visible white light and light of a first frequency (for example, infrared light in a specified frequency range), where the white light source may be a device such as an LED, and the light of the first frequency may be provided by a device such as an infrared light emitter. In addition, the light source 100 may be connected to a flexible printed circuit board (Flexible Printed Circuit Board, FPC), and the substrate 200 may be provided on the side of the light source 100 and the light conducting layer 300.

The white light source and the infrared light source that are emitted by the light source 100 are point light sources. The plurality of white light sources and the plurality of infrared light sources may be arranged in various ways. For example, three white light sources and two infrared light sources are arranged in parallel, or one white light source and one infrared light source are arranged in parallel. The specific arrangement of the light sources may vary depending on actual conditions, which is not limited in this embodiment of this disclosure.

After the light source 100 emits a white light source and the light of the first frequency (for example, an infrared light source), the two light sources enter the light conducting layer 300, and the light conducting layer 300 may convert the white light source and the infrared light source that are emitted by the light source 100 from point light sources to surface light sources, thereby reducing the differences in the intensity of light emitted from different regions of the light conducting layer 300, and the light conducting layer 300 disperses the light of the first frequency.

The light absorbing layer 500 may be provided on the other side of the connected light source 100 and the light conducting layer 300. After the plurality of infrared emitters on the light source 100 emit light of the first frequency, the light of the first frequency is dispersed by the light conducting layer 300, passes through the light absorbing layer 500 connected to the light source 100, and then reaches the photosensitive layer 600. The light absorbing layer 500 may include a container 501 forming a closed space. The container 501 may store an absorption liquid 502, and the absorption liquid 502 has no absorbing effect on the white light source. An inelastic surface of the container 501 is connected to the light source 100. Both sides of the container 501 have good light transmittance, to ensure that the light of the first frequency passes through the inelastic surface of the container 501 to reach the absorption liquid 502, and after passing through the absorption liquid 502, passes through an elastic surface 5011 of the container to reach the photosensitive layer 600. The elastic surface 5011 of the container has high strength and is not prone to deformation. The elastic surface 5011 of the container also needs to have good elasticity. In a case of receiving external pressure, the elastic surface 5011 of the container may be deformed due to the pressure. After the external pressure is removed, the elastic surface 5011 of the container can immediately restore the original shape. Moreover, the elastic surface 5011 of the container also has good durability. The pressure detection apparatus is mainly configured to detect intensity of the light of the first frequency that changes with the external pressure, and the good durability of the elastic surface 5011 of the container ensures that the light transmittance is not reduced due to long-time and frequent pressing.

In another manner, the container may include a plurality of sub-containers, and each sub-container is filled with the absorption liquid. The container may have an elastic surface and an inelastic surface. If the container includes a plurality of sub-containers, an amount of absorption liquid contained in each sub-container is not too large, and the influence of gravity is reduced, which can improve the detection accuracy.

The absorption liquid 502 stored in the container 501 may be a liquid that has a specified absorption effect on the light of the first frequency (for example, a specified frequency $f_0$), where the light of the first frequency may be infrared light with frequencies within a predetermined frequency range, and the absorption liquid 502 has no absorption effect on visible light, and does not affect a propagation direction of the light. After passing through the container 501 storing the absorption liquid 502, the light of the first frequency reaches the photosensitive layer 600. The photosensitive layer 600 is connected to the elastic surface 5011 of the container. The photosensitive layer 600 may be a film that is sensitive to light of the first frequency. For example, the photosensitive layer 600 may be sensitive to infrared light of a specified frequency or frequencies within a predetermined frequency range. The photosensitive layer 600 has good elasticity, durability, and light resistance. The photosensitive layer 600 may detect the light of the first frequency through thermal effect, photoelectric effect, or the like. The detection of the light of the first frequency through the resistance effect may be: After the light of the first frequency irradiates the photosensitive layer 600, a material on the photosensitive layer 600 heats up due to absorption of the light of the first frequency, which causes a resistance change, achieving the purpose of detecting the light of the first frequency. The detection of the light of the first frequency through the photoelectric effect may be: After the material on the photosensitive layer 600 absorbs the light of the first frequency, photoelectrons are generated due to the photoelectric effect, which causes a current change, achieving the purpose of detection. In addition to detecting the light of the first frequency through the thermal effect and the photoelectric effect, there may also be a plurality of detection methods, which may vary according to specific application scenarios and are not limited in the embodiments of this disclosure.

The light source 100 may include a plurality of white light sources and a plurality of infrared light sources. After the light source 100 emits white light (that is, visible light) and light of the first frequency (such as infrared light of a specific frequency), the light conducting layer 300 can convert the white light source and the light of the first frequency from point light sources to surface light sources, and disperse the light of the first frequency. The light of the first frequency and visible light can pass through the inelastic surface of the container 501 and reach the absorption liquid 502. The absorption liquid 502 cannot absorb the visible light, but it can absorb a part of the light of the first frequency. The unabsorbed light of the first frequency can reach the photosensitive layer 600. After the photosensitive layer 600 detects the light of the first frequency, it produces resistance changes or photoelectrons, thereby causing current changes. In a case that a finger or another object presses the pressure detection apparatus, the photosensitive layer 600 of the pressure detection apparatus and the elastic surface 5011 of the container can produce concave deformation. At the concave position, the thickness of the absorption liquid 502 becomes smaller. Correspondingly, the absorbed light of the first frequency at this position decreases, the intensity of the light reaching the photosensitive layer 600 increases, and the resistance or photoelectrons generated at the corresponding position change, thereby generating a current change signal to determine the position pressed by the finger or another object.

The pressure detection apparatus provided in this embodiment of this disclosure includes the substrate, the light conducting layer, the light absorbing layer, and the photosensitive layer that are arranged in order, and further includes the light source. The light source is capable of emitting the light of the first frequency, and the emergent surface of the light source faces toward the light conducting layer. The light conducting layer disperses the light of the first frequency. The light absorbing layer includes the container forming a closed space and the absorption liquid filling the container, where the absorption liquid absorbs at least a part of the light of the first frequency, and at least one side surface of the container is an elastic surface. The photosensitive surface of the photosensitive layer faces toward the light absorbing layer, and the photosensitive layer is used to detect the light of the first frequency that passes through the light absorbing layer. In this way, based on the structure of the above-mentioned pressure detection apparatus, the photosensitive layer may be used to reduce interference of ambient light on the pressure detection apparatus, and the structure of the light source and the absorption liquid can improve sensitivity of pressure detection under pressure induction and improve user experience while ensuring the detection accuracy.

Embodiment 2

Figure 2:
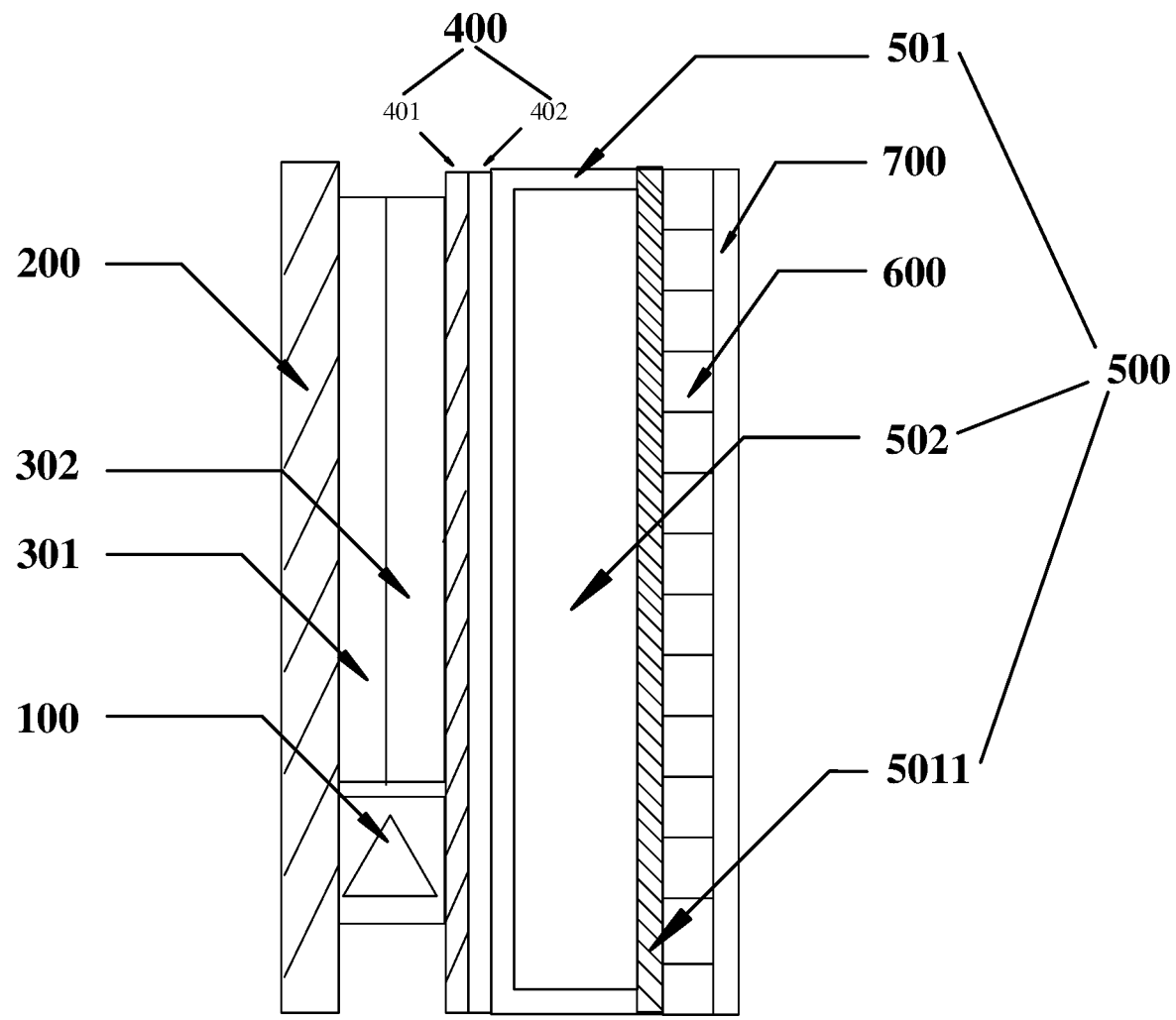
FIG. 2 is a schematic structural diagram of another pressure detection apparatus according to this application.

An embodiment of this disclosure provides another pressure detection apparatus. The pressure detection apparatus includes all the functional units of the pressure detection apparatus shown in FIG. 1, and is improved on this basis. As shown in FIG. 2, the improvements are as follows:

In the light source 100, a white light source and an infrared light source may be alternately arranged, so that the light source 100 can emit uniform visible light and infrared light (that is, the light of the first frequency).

As shown in FIG. 2, after the light source 100 emits the light of the first frequency and the white light source, the light of the first frequency may be dispersed through the light conducting layer 300. The light conducting layer 300 may include a reflective plate 302 and a light guide plate 301. The reflective plate 302 and the light guide plate 301 are arranged on the light conducting layer 300 in order, and the light guide plate 301 may be arranged on one side surface of the substrate 200. An emergent surface of the light source 100 may face toward the light guide plate 301. The light of the first frequency emitted by the light source 100 may be first converted from a point light source to a surface light source through the light guide plate 301, and then the light of the first frequency may pass through the reflective plate 302 to reflect stray light in the light source to a display side, thereby reducing the intensity loss of the light of the first frequency, and increasing detection accuracy of the pressure detection apparatus.

A light processing assembly 400 may be provided between the light conducting layer 300 and the light absorbing layer 500. The light processing assembly 400 may include a refracting plate 401 and a polarizing plate 402. The refracting plate 401 and the polarizing plate 402 may be arranged in parallel or stacked. There may be various arrangements, which are not limited in this embodiment of this disclosure. The light processing assembly 400 uses the refracting plate 401 and the polarizing plate 402 to refract the light of the first frequency and the visible light that are emitted by the light source 100, so that the visible light and the light of the first frequency are emitted in parallel, to improve the uniformity of light intensity.

A light transmittance of the light absorbing layer may be higher than a predetermined light transmittance threshold, and its change rate with the deformation is less than a predetermined change rate threshold. The light transmittance may represent a capability of light passing through a medium, and is a percentage of the light of the first frequency that passes through the light absorbing layer to the light of the first frequency that irradiates the light absorbing layer. A greater light transmittance of the light absorbing layer indicates better light permeability of the light absorbing layer 301. Therefore, to ensure the accuracy of the pressure detection apparatus, the light transmittance of the light absorbing layer needs to be greater than a predetermined light transmittance threshold, to ensure the amount of the light of the first frequency that passes through the light absorbing layer. Moreover, a change rate of the light transmittance of the light absorbing layer with deformation may be less than a predetermined change rate threshold. If the change rate of the light transmittance of the light absorbing layer with deformation is higher than the predetermined change rate threshold, a degree of change in light transmittance of the light absorbing layer with deformation is smaller, that is, the light transmittance of the light absorbing layer is insensitive to deformation of the light absorbing layer, making the pressure detection apparatus less sensitive to pressure, leading to poor sensitivity of the pressure detection apparatus. Therefore, the change rate of the light transmittance of the light absorbing layer with deformation may be less than the predetermined change rate threshold.

The absorption liquid 502 may be used to absorb a part of the light of the first frequency, that is, infrared light in a predetermined frequency range, and the absorption liquid 502 has no absorption effect on visible light. After the light source 100 emits the light of the first frequency (for example, infrared light of a specified frequency $f_0$) and visible light, the emitted light of the first frequency needs to pass through the absorption liquid 502. In this case, the absorption liquid 502 can absorb a part of the infrared light in the predetermined frequency range, but has no absorption effect on the visible light and does not affect a propagation direction of the light.

In addition, an absorption degree of the infrared light by the absorption liquid 502 is positively correlated with a distance that the infrared light passes through the absorption liquid 502. The absorption degree of the infrared light by the absorption liquid 502 is positively correlated with the distance that the infrared light passes through the absorption liquid 502. To be specific, a greater thickness of the absorption liquid 502 indicates a higher absorption degree of the infrared light and a lower intensity of the infrared light passing through the absorption liquid 502. For example, assuming that a ratio coefficient between the absorption degree of the infrared light by the absorption liquid 502 and the distance that the infrared light passes through the absorption liquid 502 is 2, if a distance that six infrared light beams need to pass through the absorption liquid 502 is 1, the absorption liquid 502 may absorb two infrared light beams, and only four infrared light beams pass through the absorption liquid 502. Assuming that a ratio coefficient between the absorption degree of the infrared light by the absorption liquid 502 and the distance that the infrared light passes through the absorption liquid 502 is 4, if a distance that six infrared light beams need to pass through the absorption liquid 502 is 1, the absorption liquid 502 may absorb four infrared light beams, and only two infrared light beams pass through the absorption liquid 502. In addition, an absorption capacity of the absorption liquid 502 for the infrared light is not associated with the ambient temperature at which the pressure detection apparatus is located. This can improve anti-environment interference ability for pressure detection and ensure detection accuracy.

Figure 3:
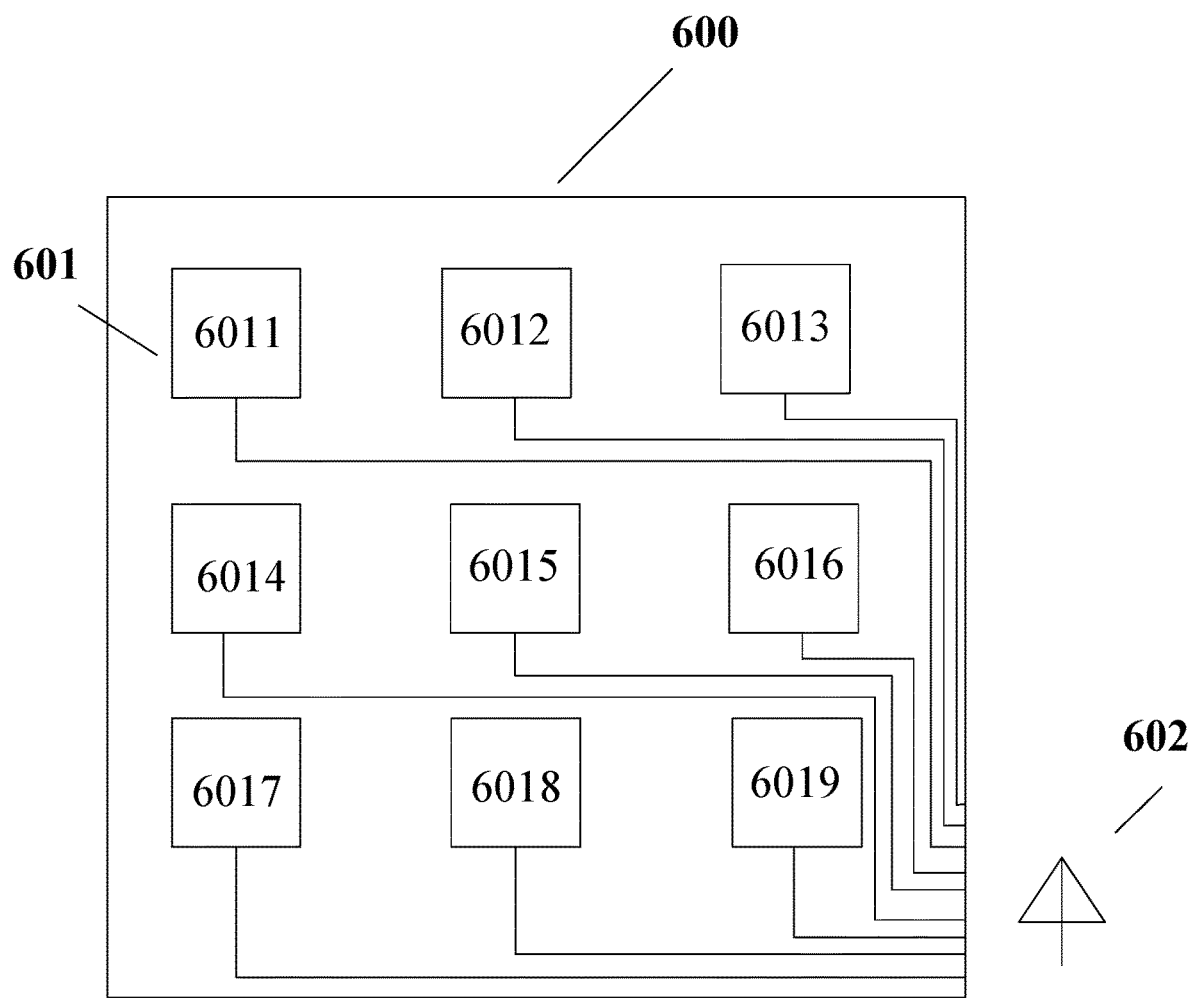
FIG. 3 is a schematic structural diagram of a photosensitive layer according to this application.

The photosensitive layer 600 may be provided with a detector 602 and a plurality of photosensitive blocks 601. As shown in FIG. 3, the plurality of photosensitive blocks 601 may be arranged on the photosensitive layer 600 in a predetermined arrangement to form a photosensitive array, and each photosensitive block 601 may have a wire connected to the detector 602. The detector 602 may determine a position of an infrared light intensity change based on monitored current change on the photosensitive block 601, and the photosensitive block 601 is located on an upper layer of an elastic surface 5011 of the container. In a case that pressure is detected on the pressure detection apparatus, the elastic surface 5011 of the container is deformed at the position at which the pressure is generated. The deformation of the elastic surface 5011 of the container causes a change in a thickness of the absorption liquid 502 at the corresponding position. The change in thickness affects a capability of the absorption liquid 502 to absorb the infrared light, and the photosensitive block 601 detects the change in the infrared light, which causes a current change on the photosensitive block 601. In this case, the detector 602 can detect a position of the photosensitive block 601 on which the current changes, to determine the position of the pressure generated on the pressure detection apparatus. For example, in FIG. 3, a plurality of photosensitive blocks 601 such as a photosensitive block 6011, a photosensitive block 6012, ..., and a photosensitive block 6019 are arranged in an array on the photosensitive layer 600, and each photosensitive block 601 is connected to the detector 602 by a wire. If the detector 602 detects a current change at a position of the photosensitive block 6012, it can be determined that positions of the photosensitive block 6011 and the photosensitive block 6012 have a change in light intensity, in other words, an external pressure is received at the positions of the photosensitive block 6011 and the photosensitive block 6012.

A light shielding layer 700 may be provided above the photosensitive layer 600. The light shielding layer 700 is mainly used to block interference of external light from the pressure detection apparatus, preventing the detection accuracy of the pressure detection apparatus from being reduced by the interference of external light. The light shielding layer 700 also has relatively high elasticity and durability. The light shielding layer 700 can block external infrared light from passing through the light shielding layer 700, while allowing internal light of the pressure detection apparatus to pass through the light shielding layer 700.

Figure 4:
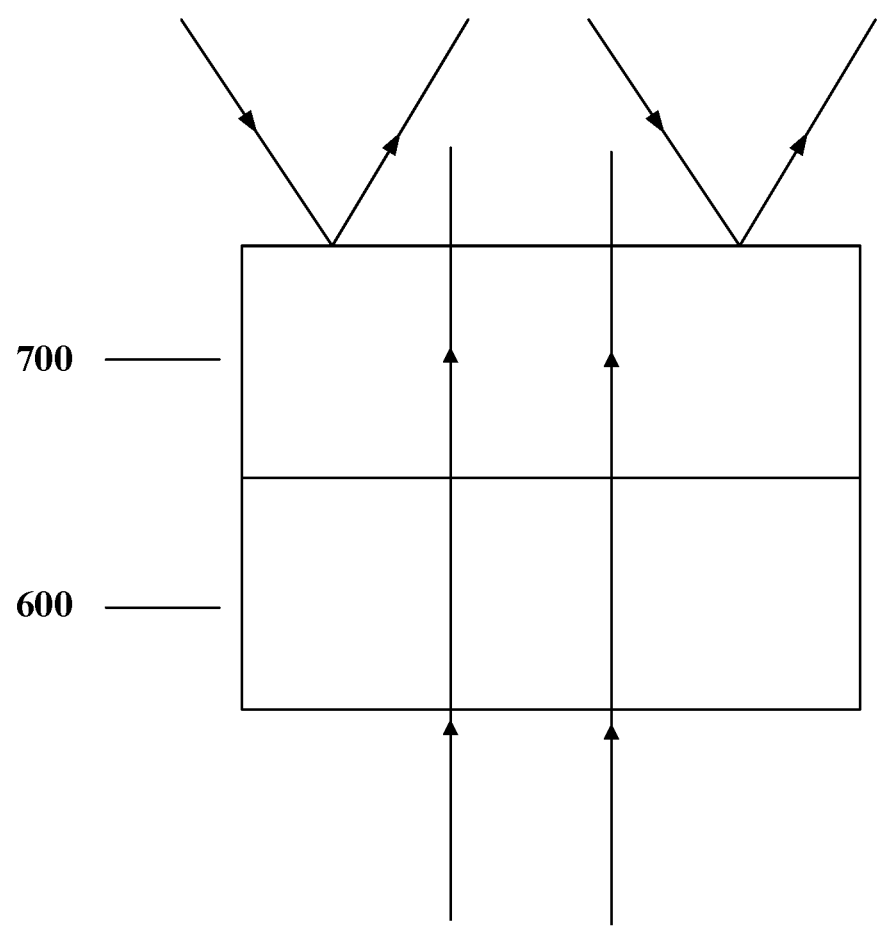
FIG. 4 is a schematic structural diagram of a photosensitive layer and a light shielding layer according to this application.

As shown in FIG. 4, the light shielding layer 700 is located on the upper layer of the photosensitive layer 600, and the photosensitive layer 600 is located on the upper layer of the light absorbing layer 500. After the light of the first frequency passes through the container 501, the light of the first frequency reaches the photosensitive layer 600. The photosensitive layer 600 is used to detect the light of the first frequency, and the light shielding layer 700 may be used to block the interference of external light from a light absorber, so as to prevent infrared light in the external light from irradiating on the photosensitive layer 600 and affecting judgment of the photosensitive layer 600 on actual infrared light changes.

Figure 5:
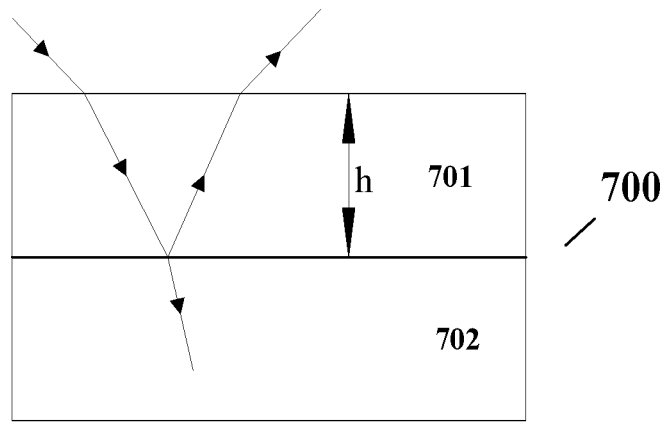
FIG. 5 is a schematic structural diagram of a light shielding layer according to this application.

As shown in FIG. 5, the light shielding layer 700 may include a base film 702 and a reflection increasing film 701. A refractive index of the reflection increasing film 701 may be greater than that of the base film 702. A thickness of the reflection increasing film 701 may fall within a predetermined thickness range. The base film 702 is provided on the upper layer of the photosensitive layer 600, and the reflection increasing film 701 is provided above the base film 702. A refractive index of the infrared light in the air is $n_0$, a refractive index of the infrared light in the reflection increasing film 701 is $n_1$, and a refractive index of the infrared light in the base film 702 is $n_2$. In a case that external infrared light irradiates from the air to the pressure detection apparatus, refraction and reflection shown in FIG. 5 occur, the infrared light forms a series of parallel beams on both sides of the reflection increasing film 701, and the Fresnel formula is satisfied:

$$R = \frac{(n_0 - n_2)\cos^2\frac{\varphi}{2} + \left(\frac{n_0 n_2}{n_1} - n_1\right)^2 \sin^2\frac{\varphi}{2}}{(n_0 + n_2)\cos^2\frac{\varphi}{2} + \left(\frac{n_0 n_2}{n_1} + n_1\right)^2 \sin^2\frac{\varphi}{2}}$$

In the above formula, R is a reflectivity of the reflection increasing film 702, that is, a ratio of intensity of reflected light to intensity of projected light, and $\varphi$ is a phase difference between two adjacent beams of light.

In a case that a refractive index $n_1$ of the reflection increasing film 701 is greater than a refractive index $n_2$ of the base film 702, and that a thickness h of the reflection increasing film 701 is an odd multiple of $$\frac{c}{4 f_0 n_1},$$

there is the maximum reflectivity R, and the intensity of the reflected light is far greater than intensity of transmitted light. In this case, it can be considered that all infrared light with a frequency of $f_0$ in the air is reflected.

The light source 100 may include a plurality of white light sources and a plurality of infrared light sources. After the light source 100 emits white light (that is, visible light) and the light of the first frequency (for example, infrared light of a specified frequency), the light guide plate 301 in the light conducting layer 300 may convert the white light source and the infrared light source from point light sources to surface light sources, and then the reflective plate 302 on the light conducting layer 300 emits stray light refracted by the light guide plate to a display side to reduce loss of light intensity. After being refracted by the refractive plate 401 and the polarizing plate 402, the infrared light and the visible light become uniform light, pass through the inelastic surface of the container 501, and reach the absorption liquid 502. The absorption liquid 502 has no absorption effect on the visible light, but can absorb a part of the infrared light. Unabsorbed infrared light may reach the photosensitive layer 600. After the photosensitive layer 600 detects the infrared light, resistance changes or photoelectrons are generated, thereby causing current changes. In a case that a finger or another object presses the pressure detection apparatus, the light shielding layer 700 and the photosensitive layer 600 of the pressure detection apparatus and the elastic surface 5011 of the container can produce concave deformation. At the concave position, the thickness of the absorption liquid 502 becomes smaller. Correspondingly, the absorbed infrared light at this position decreases, the intensity of light reaching the photosensitive layer 600 increases, and the resistance or photoelectrons generated at the corresponding position change, thereby generating a current change signal to determine the position pressed by the finger or another object.

The pressure detection apparatus provided in this embodiment of this disclosure includes the substrate, the light conducting layer, the light absorbing layer, and the photosensitive layer that are arranged in order, and further includes the light source. The light source is capable of emitting the light of the first frequency, and the emergent surface of the light source faces toward the light conducting layer. The light conducting layer disperses the light of the first frequency. The light absorbing layer includes the container forming a closed space and the absorption liquid filling the container, where the absorption liquid absorbs at least a part of the light of the first frequency, and at least one side surface of the container is an elastic surface. The photosensitive surface of the photosensitive layer faces toward the light absorbing layer, and the photosensitive layer is used to detect the light of the first frequency that passes through the light absorbing layer. In this way, based on the structure of the above-mentioned pressure detection apparatus, the photosensitive layer may be used to reduce interference of ambient light on the pressure detection apparatus, and the structure of the light source and the absorption liquid can improve sensitivity of pressure detection under pressure induction and improve user experience while ensuring the detection accuracy.

Embodiment 3

Figure 6:
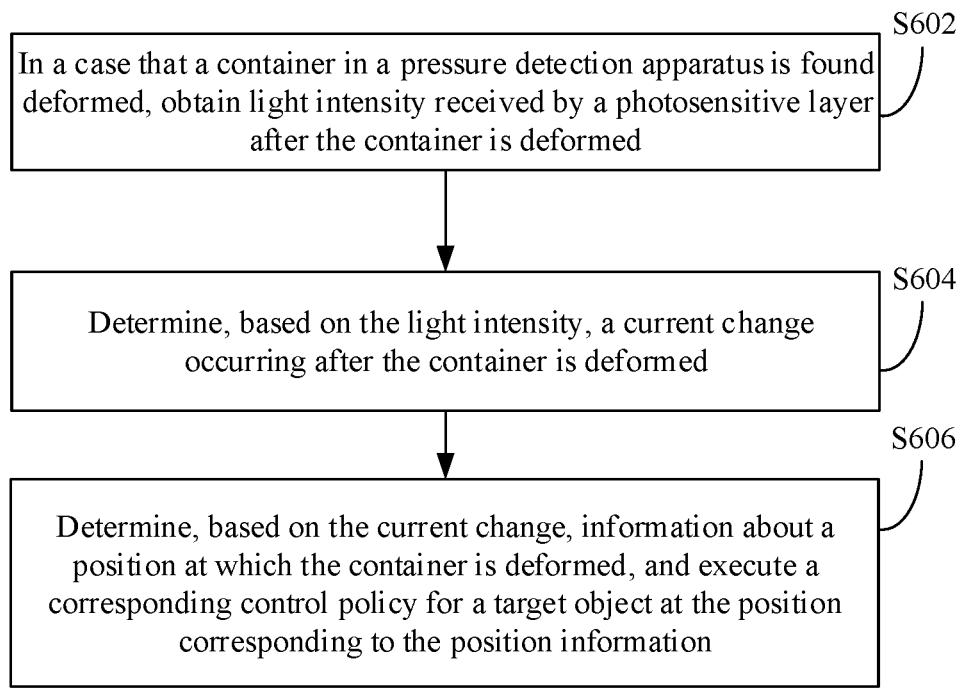
FIG. 6 is a flowchart of an embodiment of a pressure detection method according to this application.

The foregoing describes the pressure detection apparatus provided in the embodiments of this disclosure. Based on the functions and composition structure of the pressure detection apparatus, an embodiment of this disclosure further provides a pressure detection method. The method may be performed by a mobile terminal. The mobile terminal may include the pressure detection apparatus in Embodiment 1 or Embodiment 2. The mobile terminal may be, for example, a mobile phone or a tablet computer. The mobile terminal may be a mobile terminal used by a user. As shown in FIG. 6, the method may specifically include the following steps.

Step S602: In a case that a container 501 in the pressure detection apparatus of the mobile terminal is found deformed, obtain light intensity received by a photosensitive layer 600 after the container 501 is deformed.

In implementation, a light source 100 in a pressure detection apparatus shown in FIG. 7(a) continuously emits infrared light of a specified frequency (for example, $f_0$) and visible white light, or emits infrared light pulses for scanning. The infrared light passes through an inelastic surface of the container 501 and reaches an absorption liquid 502; and a part of the infrared light is absorbed by the absorption liquid 502 in the container 501. The photosensitive layer 600 detects the infrared light passing through the absorption liquid 502. Resistance changes or photoelectrons are generated by the infrared light, thereby causing current changes.

A detector 602 may record a reference current $I_0$ of each photosensitive block 601 when no pressure is received by the pressure detection apparatus. $I_0$ may be a preset fixed current value, or may be data updated during calibration of the pressure detection apparatus. As shown in FIG. 7(b), when the pressure detection apparatus receives external pressure, a light shielding layer 700, the photosensitive layer 600, and an elastic surface 5011 of the container are depressed. At the depression position, a thickness of the absorption liquid 502 is reduced, the absorbed infrared light is reduced, and the intensity of light reaching the photosensitive layer 600 increases. The light intensity is obtained at this time, that is, the light intensity after the container 501 is deformed.

The absorption liquid 502 has no absorption effect on the visible white light. After the visible white light passes through the container 501 and the absorption liquid 502, no gas effect is produced. The visible white light is only used for screen image display.

Step S604: Determine, based on the light intensity, a current change occurring after the container 501 is deformed.

In implementation, the current change at the corresponding position of the container 501 is determined based on light intensities before and after the deformation obtained in step S602.

Step S606: Determine, based on the current change, information about a position at which the container 501 is deformed, and execute a corresponding control policy for a target object at the position corresponding to the position information.

The target object may be any object that may implement a control policy, for example, an application object, a control object (determining, deleting, editing, or the like), an image object, and a text object. The control policy may be any policy such as deleting, editing, and opening.

In implementation, a detector analyzes the current change, determines, on the pressure detection apparatus, the information about the position at which the container 501 is deformed, determines the target object based on the position information, obtains the control policy corresponding to the target object, and executes the control policy. For example, in FIG. 3, if the deformed position is a position corresponding to a photosensitive block 6012, and a target object corresponding to the photosensitive block is a camera application, the corresponding control policy is opening the camera application. When the position (the position corresponding to the photosensitive block 6012) is deformed, the control policy of opening the camera application is executed.

In addition, based on the current change, different control policies may be used for target objects at the same position. For example, when the current change is greater than a specified threshold, control policies such as deleting or re-sorting may be executed on the camera application. When the current change is less than a specified threshold, the policy of opening the camera application may be executed.

This embodiment of this disclosure provides a pressure detection method. The method may be applied to a mobile terminal, the mobile terminal includes a pressure detection apparatus, and the pressure detection apparatus may include a substrate, a light conducting layer, a light absorbing layer, and a photosensitive layer that are arranged in order, and further includes a light source. The light source is capable of emitting light of a first frequency, and an emergent surface of the light source faces toward the light conducting layer. The light conducting layer disperses the light of the first frequency. The light absorbing layer includes a container forming a closed space and an absorption liquid filling the container, where the absorption liquid absorbs at least a part of the light of the first frequency, and at least one side surface of the container is an elastic surface. The photosensitive surface of the photosensitive layer faces toward the light absorbing layer, and the photosensitive layer is used to detect the light of the first frequency that passes through the light absorbing layer. In this way, based on the structure of the above-mentioned pressure detection apparatus, the photosensitive layer may be used to reduce interference of ambient light on the pressure detection apparatus, and the structure of the light source and the absorption liquid can improve sensitivity of pressure detection under pressure induction and improve user experience while ensuring the detection accuracy.

Embodiment 4

Figure 8:
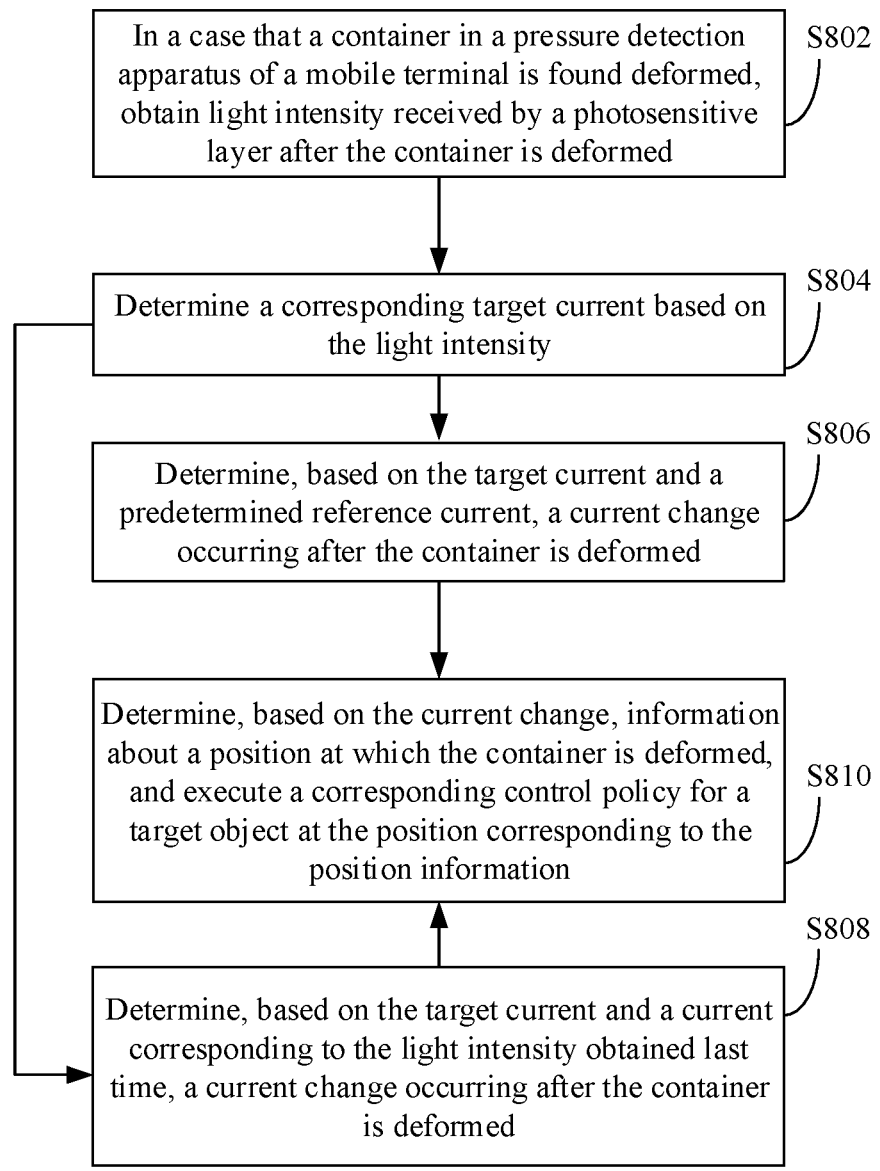
FIG. 8 is a flowchart of another embodiment of a pressure detection method according to this application.

As shown in FIG. 8, an embodiment of this disclosure provides a pressure detection method. The method may be performed by a mobile terminal. The mobile terminal may include the pressure detection apparatus in Embodiment 1 or Embodiment 2. The mobile terminal may be, for example, a mobile phone or a tablet computer. The mobile terminal may be a mobile terminal used by a user. This method may specifically include the following steps.

Step S802: In a case that a container 501 in the pressure detection apparatus of the mobile terminal is found deformed, obtain light intensity received by a photosensitive layer 600 after the container 501 is deformed.

For a specific processing process of S802, reference may be made to related content in step S602 in the foregoing Embodiment 3. Details are not described herein again.

Step S804: Determine a corresponding target current based on the light intensity.

Step S806: Determine, based on the target current and a predetermined reference current, a current change occurring after the container 501 is deformed.

Figure 7:
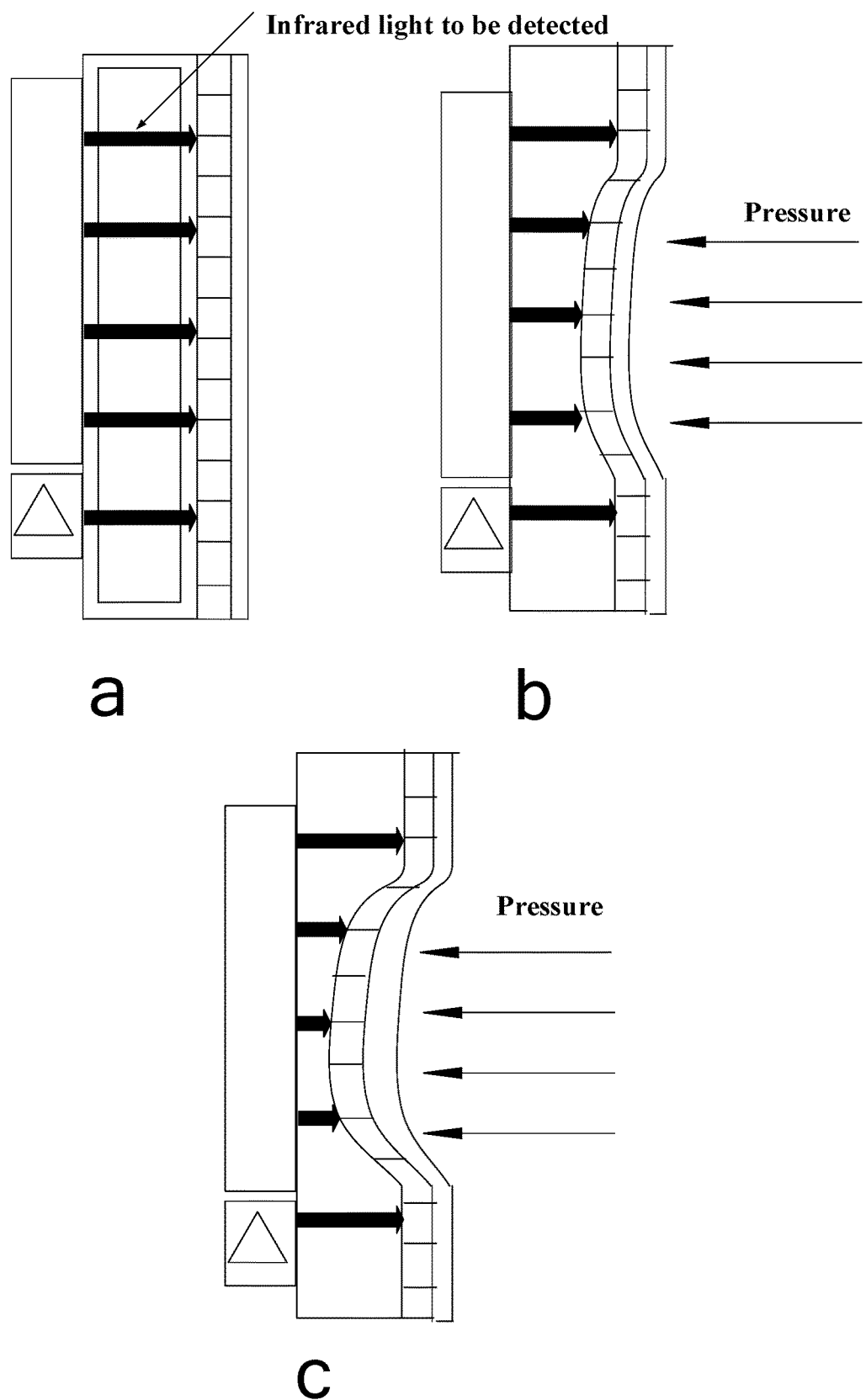
FIG. 7 is a schematic diagram of deformation caused by received pressure according to this application.

In implementation, the predetermined reference current may be a current when no deformation occurs. For example, in FIG. 7, in a case that deformation in FIG. 7(b) is formed on the basis of FIG. 7(a), the current change after the container 501 is deformed is a current difference between a current $I_1$ corresponding to the deformation generated in FIG. 7(b) and a current $I_0$ corresponding to FIG. 7(a). In this case, the predetermined reference current is $I_0$, and the target current is $I_1$.

In addition, based on the current corresponding to the target current and the light intensity obtained last time, the specific processing steps are as follows:

Step S808: Determine, based on a current corresponding to the target current and the light intensity obtained last time, a current change occurring after the container 501 is deformed.

In implementation, if deformation continues on the basis of FIG. 7(b) and a deformation status in FIG. 7(c) is formed, the predetermined reference current is a current $I_1$ corresponding to the deformation generated in FIG. 7(b), the target current is a current $I_2$ corresponding to the deformation generated in FIG. 7 (c), and the current change is a difference between $I_2$ and $I_1$.

Step S810: Determine, based on the current change, information about a position at which the container 501 is deformed, and execute a corresponding control policy for a target object at the position corresponding to the position information.

For a specific processing process of S810, reference may be made to related content in step S606 in the foregoing Embodiment 3. Details are not described herein again.

This embodiment of this disclosure provides a pressure detection method. The method may be applied to a mobile terminal, the mobile terminal includes a pressure detection apparatus, and the pressure detection apparatus may include a substrate, a light conducting layer, a light absorbing layer, and a photosensitive layer that are arranged in order, and further includes a light source. The light source is capable of emitting light of a first frequency, and an emergent surface of the light source faces toward the light conducting layer. The light conducting layer disperses the light of the first frequency. The light absorbing layer includes a container forming a closed space and an absorption liquid filling the container, where the absorption liquid absorbs at least a part of the light of the first frequency, and at least one side surface of the container is an elastic surface. The photosensitive surface of the photosensitive layer faces toward the light absorbing layer, and the photosensitive layer is used to detect the light of the first frequency that passes through the light absorbing layer. In this way, based on the structure of the above-mentioned pressure detection apparatus, the photosensitive layer may be used to reduce interference of ambient light on the pressure detection apparatus, and the structure of the light source and the absorption liquid can improve sensitivity of pressure detection under pressure induction and improve user experience while ensuring the detection accuracy.

Embodiment 5

The foregoing describes the pressure detection apparatus provided in the embodiments of this disclosure. Based on the same concept, an embodiment of this disclosure further provides a screen assembly.

The screen assembly includes the pressure detection apparatus described in any one of the foregoing Embodiment 1 or Embodiment 2, the pressure detection apparatus includes at least two light sources, and at least one of the at least two light sources is capable of emitting light of a first frequency.

In this embodiment of this disclosure, the pressure detection apparatus includes a first light source and a second light source, where the first light source is configured to emit visible light, and the second light source is configured to emit invisible light of the first frequency.

The pressure detection apparatus includes a substrate, a light conducting layer, a light absorbing layer, and a photosensitive layer, and further includes a light source.

The light source is capable of emitting light of a first frequency, and an emergent surface of the light source faces toward the light conducting layer.

The light conducting layer disperses the light of the first frequency.

The light absorbing layer includes a container forming a closed space and an absorption liquid filling the container, where the absorption liquid absorbs at least a part of the light of the first frequency, and at least one side surface of the container is an elastic surface.

A photosensitive surface of the photosensitive layer faces toward the light absorbing layer, and the photosensitive layer is used to detect the light of the first frequency that passes through the light absorbing layer.

In this embodiment of this disclosure, the light conducting layer includes a reflective plate and a light guide plate, where the reflective plate and the light guide plate are arranged in order, and the light guide plate is provided on a side surface of the substrate.

In this embodiment of this disclosure, the pressure detection apparatus further includes a light shielding layer, where the light shielding layer is provided on a back side of a photosensitive surface of the photosensitive layer.

In this embodiment of this disclosure, the pressure detection apparatus further includes a light processing assembly, where the light processing assembly includes a refractive plate and a polarizing plate, and the refractive plate and the polarizing plate are adjacent to each other and are provided between the light conducting layer and the light absorbing layer.

In this embodiment of this disclosure, a side surface of the container facing toward the light absorbing layer is an elastic surface, and a side surface of the container facing toward the light source is an inelastic surface.

In this embodiment of this disclosure, a light transmittance of the container is higher than a predetermined light transmittance threshold.

In this embodiment of this disclosure, an absorbed amount of the light of the first frequency by the absorption liquid is positively correlated with a distance that the light of the first frequency passes through the absorption liquid.

In this embodiment of this disclosure, a detector and a plurality of photosensitive blocks are provided on the photosensitive layer, the plurality of photosensitive blocks are separately connected to the detector, the photosensitive block is configured to detect light intensity of the light of the first frequency and convert the detected light intensity into a current, and the detector is configured to determine, based on changes of the current, positions of the photosensitive blocks corresponding to light intensity changes.

In this embodiment of this disclosure, the light shielding layer is used to block light in a predetermined frequency range from passing through.

In this embodiment of this disclosure, the light shielding layer includes a base film and a reflection increasing film, a refractive index of the reflection increasing film is greater than that of the base film, a thickness of the reflection increasing film falls within a predetermined thickness range, the base film is provided above the photosensitive layer, and the reflection increasing film is provided above the base film.

In this embodiment of this disclosure, a thickness of the reflection increasing film is an odd multiple of $$\frac{c}{4f_0 n_1}.$$

This embodiment of this disclosure provides a screen assembly, including the pressure detection apparatus described in the foregoing embodiments. The pressure detection apparatus may include the substrate, the light conducting layer, the light absorbing layer, and the photosensitive layer that are arranged in order, and further includes the light source. The light source is capable of emitting the light of the first frequency, and the emergent surface of the light source faces toward the light conducting layer. The light conducting layer disperses the light of the first frequency. The light absorbing layer includes the container forming a closed space and the absorption liquid filling the container, where the absorption liquid absorbs at least a part of the light of the first frequency, and at least one side surface of the container is an elastic surface. The photosensitive surface of the photosensitive layer faces toward the light absorbing layer, and the photosensitive layer is used to detect the light of the first frequency that passes through the light absorbing layer. In this way, based on the structure of the above-mentioned pressure detection apparatus, the photosensitive layer may be used to reduce interference of ambient light on the pressure detection apparatus, and the structure of the light source and the absorption liquid can improve sensitivity of pressure detection under pressure induction and improve user experience while ensuring the detection accuracy.

Embodiment 6

Figure 9:
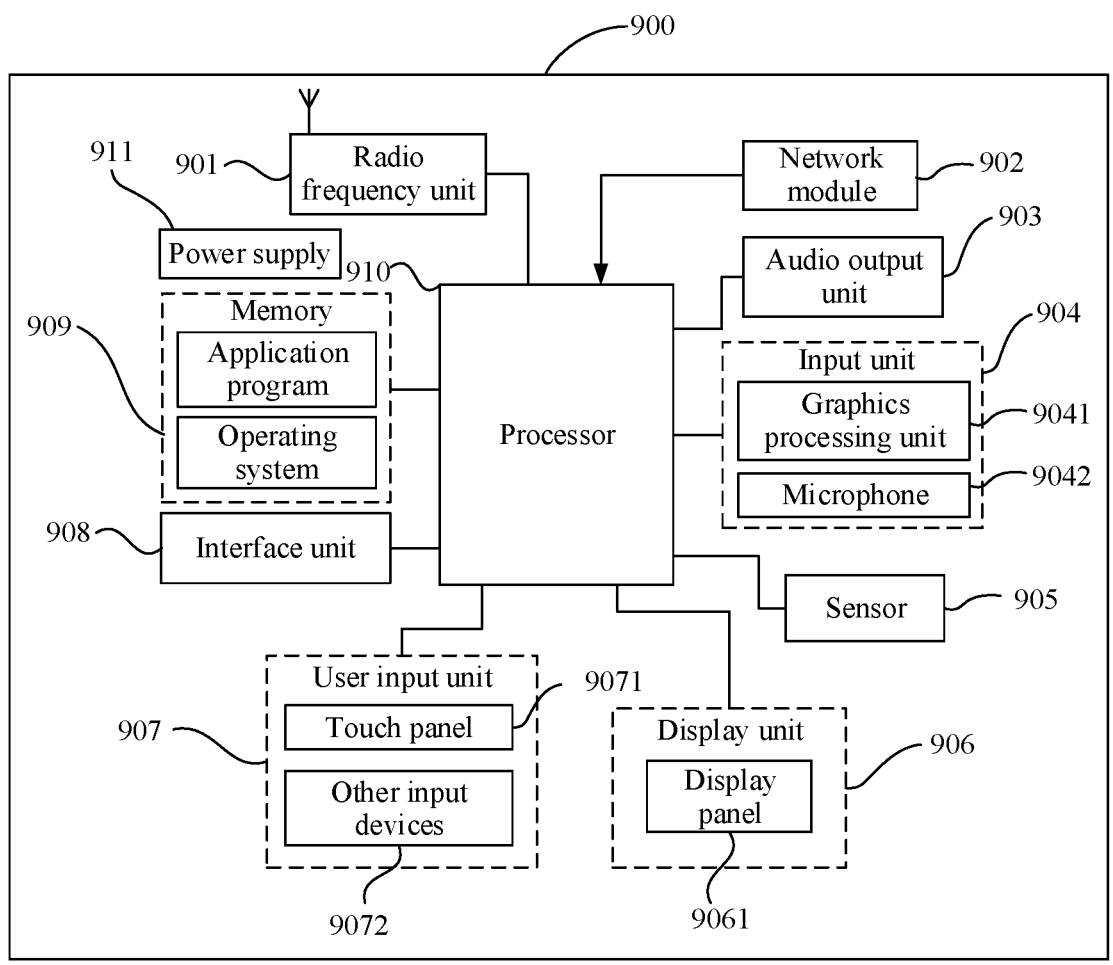
FIG. 9 is an embodiment of a mobile terminal according to this application.

FIG. 9 is a schematic structural diagram of hardware of a mobile terminal for implementing the embodiments of this disclosure.

The mobile terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the mobile terminal structure shown in FIG. 9 does not constitute a limitation on the mobile terminal. The mobile terminal may include more or fewer components than those shown in the figure, or some components may be combined, or there may be a different component layout. In this embodiment of this disclosure, the mobile terminal includes but is not limited to a mobile phone, a tablet computer, a laptop computer, a palmtop computer, an in-vehicle terminal, a wearable device, a pedometer, and the like.

The pressure detection apparatus includes a substrate, a light conducting layer, a light absorbing layer, and a photosensitive layer that are arranged in order, and further includes a light source.

The light source is capable of emitting light of a first frequency, and an emergent surface of the light source faces toward the light conducting layer.

The light conducting layer disperses the light of the first frequency.

The light absorbing layer includes a container forming a closed space and an absorption liquid filling the container, where the absorption liquid absorbs at least a part of the light of the first frequency, and at least one side surface of the container is an elastic surface.

A photosensitive surface of the photosensitive layer faces toward the light absorbing layer, and the photosensitive layer is used to detect the light of the first frequency that passes through the light absorbing layer.

In addition, the light conducting layer includes a reflective plate and a light guide plate, where the reflective plate and the light guide plate are arranged in order, and the light guide plate is provided on a side surface of the substrate.

In addition, the pressure detection apparatus further includes a light shielding layer, where the light shielding layer is provided on a back side of a photosensitive surface of the photosensitive layer.

In addition, the pressure detection apparatus further includes a light processing assembly, where the light processing assembly includes a refractive plate and a polarizing plate, and the refractive plate and the polarizing plate are adjacent to each other and are provided between the light conducting layer and the light absorbing layer.

In addition, a side surface of the container facing toward the light absorbing layer is an elastic surface, and a side surface of the container facing toward the light source is an inelastic surface.

In addition, a light transmittance of the container is higher than a predetermined light transmittance threshold.

In addition, the absorption liquid is used to absorb the light of the first frequency, and an absorbed amount of the light of the first frequency by the absorption liquid is positively correlated with a distance that the light of the first frequency passes through the absorption liquid.

In addition, a detector and a plurality of photosensitive blocks are provided on the photosensitive layer, the plurality of photosensitive blocks are separately connected to the detector, the photosensitive block is configured to detect light intensity of the light of the first frequency and convert the detected light intensity into a current, and the detector is configured to determine, based on changes of the current, positions of the photosensitive blocks corresponding to light intensity changes.

In addition, the light shielding layer is used to block light in a predetermined frequency range from passing through.

In addition, the light shielding layer includes a base film and a reflection increasing film, a refractive index of the reflection increasing film is greater than that of the base film, a thickness of the reflection increasing film falls within a predetermined thickness range, the base film is provided above the photosensitive layer, and the reflection increasing film is provided above the base film.

In addition, a thickness of the reflection increasing film is an odd multiple of $$\frac{c}{4f_0 n_1}.$$

This embodiment of this disclosure provides a mobile terminal. The mobile terminal includes the pressure detection apparatus, and the pressure detection apparatus may include the substrate, the light conducting layer, the light absorbing layer, and the photosensitive layer that are arranged in order, and further includes the light source. The light source is capable of emitting the light of the first frequency, and the emergent surface of the light source faces toward the light conducting layer. The light conducting layer disperses the light of the first frequency. The light absorbing layer includes the container forming a closed space and the absorption liquid filling the container, where the absorption liquid absorbs at least a part of the light of the first frequency, and at least one side surface of the container is an elastic surface. The photosensitive surface of the photosensitive layer faces toward the light absorbing layer, and the photosensitive layer is used to detect the light of the first frequency that passes through the light absorbing layer. In this way, based on the structure of the above-mentioned pressure detection apparatus, the light shielding layer may be used to reduce interference of ambient light on the pressure detection apparatus, and the structure of the light source and the absorption liquid can improve sensitivity of pressure detection under pressure induction and improve user experience while ensuring the detection accuracy.

It should be understood that, in this embodiment of this disclosure, the radio frequency unit 901 may be configured to transmit or receive a signal in an information transmitting/receiving or call process. Specifically, the radio frequency unit 901 receives downlink data from a base station and transmits the downlink data to the processor 910 for processing; and transmits uplink data to the base station. Usually, the radio frequency unit 901 includes but is not limited to an antenna, at least one amplifier, a transceiver, a coupler, a low noise amplifier, a duplexer, and the like. In addition, the radio frequency unit 901 may further communicate with a network and another device by using a wireless communications system.

The mobile terminal provides a user with wireless broadband internet access through the network module 902, for example, helping the user to send or receive an e-mail, to browse a web page, or to access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the mobile terminal 900. The audio output unit 903 includes a loudspeaker, a buzzer, a phone receiver, and the like.

The input unit 904 is configured to receive an audio signal or a video signal. The input unit 904 may include a graphics processing unit (Graphics Processing Unit, GPU) 9041 and a microphone 9042, and the graphics processing unit 9041 processes image data of a still picture or a video obtained by an image capture apparatus (for example, a camera) in an image capture mode or a video capture mode. A processed image frame may be displayed on the display unit 906. An image frame processed by the graphics processing unit 9041 may be stored in the memory 909 (or another storage medium), or may be transmitted by the radio frequency unit 901 or the network module 902. The microphone 9042 may receive a sound and can process the sound into audio data. The processed audio data can be converted into a format output that can be sent to a mobile communication base station through the radio frequency unit 901 in a telephone call mode.

The mobile terminal 900 further includes at least one sensor 905, for example, an optical sensor, a motion sensor, and other sensors. Specifically, the optical sensor includes an ambient light sensor and a proximity sensor, where the ambient light sensor can adjust luminance of a display panel 9061 based on brightness of ambient light, and the proximity sensor can turn off the display panel 9061 and/or backlight in a case that the mobile terminal 900 is moved to an ear. As a type of motion sensor, an accelerometer sensor can detect magnitudes of accelerations in all directions (usually three axes), can detect a magnitude and a direction of gravity if the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided for the user. The display unit 906 may include the display panel 9061. Optionally, the display panel 9061 may be configured in a form of a liquid crystal display (Liquid Crystal Display, LCD), an organic light-emitting diode (Organic Light-Emitting Diode, OLED), or the like.

The user input unit 907 may be configured to receive input digit or character information and generate key signal input related to user setting and function control of the mobile terminal. Specifically, the user input unit 907 includes a touch panel 9071 and other input devices 9072. The touch panel 9071 is also referred to as a touchscreen, and may collect a touch operation of the user on or near the touch panel (for example, an operation performed on or near the touch panel 9071 by the user by using any appropriate object or accessory such as a finger or a stylus). The touch panel 9071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 910, receives a command transmitted by the processor 910, and executes the command. In addition, the touch panel 9071 may be implemented in a plurality of forms, for example, a resistive, capacitive, infrared, or surface acoustic wave touch panel. The user input unit 907 may further include the other input devices 9072 in addition to the touch panel 9071. Specifically, the other input devices 9072 may include but are not limited to a physical keyboard, a function key (for example, a volume control key or a power on/off key), a track ball, a mouse, and a joystick. Details are not described herein.

Further, the touch panel 9071 may cover the display panel 9061. After detecting a touch operation on or near the touch panel 9071, the touch panel 9071 transmits the touch operation to the processor 910 to determine a type of a touch event. Then the processor 910 provides corresponding visual output on the display panel 9061 based on the type of the touch event. Although in FIG. 9, the touch panel 9071 and the display panel 9061 act as two independent parts to implement input and output functions of the mobile terminal, in some embodiments, the touch panel 9071 and the display panel 9061 may be integrated to implement the input and output functions of the mobile terminal. This is not specifically limited herein.

The interface unit 908 is an interface connecting an external apparatus to the mobile terminal 900. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 908 may be configured to: receive input (for example, data information and power) from the external apparatus, and transmit the received input to one or more elements in the mobile terminal 900, or may be configured to transmit data between the mobile terminal 900 and the external apparatus.

The memory 909 may be configured to store software programs and various types of data. The memory 909 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 900 may include a high-speed random access memory, or may include a nonvolatile memory, for example, at least one magnetic disk storage device or a flash memory device, or another volatile solid-state storage device.

The processor 910 is a control center of the mobile terminal, and is connected to all components of the mobile terminal by using various interfaces and lines. By running or executing a software program and/or module that is stored in the memory 909 and calling data stored in the memory 909, the processor 910 executes various functions of the mobile terminal and processes data, so as to perform overall monitoring on the mobile terminal. The processor 910 may include one or more processing units. Optionally, the processor 910 may integrate an application processor and a modem processor. The application processor mainly processes an operating system, a user interface, an application program, and the like. The modem processor mainly processes wireless communication. It can be understood that the modem processor may be alternatively not integrated in the processor 910.

The mobile terminal 900 may further include the power supply 911 (for example, a battery) supplying power to all components. Preferably, the power supply 911 may be logically connected to the processor 910 through a power management system. In this way, functions such as charge management, discharge management, and power consumption management are implemented by using the power management system.

Optionally, an embodiment of this disclosure further provides a mobile terminal, including: a processor 910, a memory 909, and a computer program that is stored in the memory 909 and capable of running on the processor 910. When the computer program is executed by the processor 910, processes in the foregoing embodiments of the resource configuration method are implemented, with the same technical effects achieved. To avoid repetition, details are not described herein again.

Embodiment 7

An embodiment of this disclosure further provides a computer-readable storage medium, where the computer-readable storage medium stores a computer program, and when the computer program is executed by a processor, all processes of the foregoing pressure detection method embodiment are implemented, with a same technical effect achieved. Therefore, details are not described herein again to avoid repetition. For example, the computer-readable storage medium is a read-only memory (Read-Only Memory, ROM), a random access memory (Random Access Memory, RAM), a magnetic disk, or an optical disc.

This embodiment of this disclosure provides a computer-readable storage medium. The structure of the pressure detection apparatus described above can be used to reduce interference of ambient light on the pressure detection apparatus. The structure of the light source and the absorption liquid can improve sensitivity of pressure detection and improve user experience while ensuring the detection accuracy.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more processors (CPU), an input/output interface, a network interface, and a memory.

The memory may include a form of a non-permanent memory such as a random access memory (RAM) and/or a non-volatile memory such as a read-only memory (ROM) or a flash memory (flash RAM) in computer-readable media. The memory is an example of the computer-readable medium.

Computer-readable media include permanent and non-permanent, removable and non-removable media, and information storage may be implemented by any method or technology. The information may be computer-readable instructions, a data structure, a program module, or other data. Examples of computer storage media include, but are not limited to, a phase-change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette, a magnetic tape, a magnetic disk storage or other magnetic storage devices, or any other non-transmission media, which can be used to store information that can be accessed by a computing device. As defined in this specification, the computer-readable medium does not include transitory computer-readable media (transitory media), such as a modulated data signal and carrier.

It should be noted that the terms "include", "comprise", or any other variations thereof are intended to cover a non-exclusive inclusion, so that a process, a method, a commodity, or a device including a set of elements not only includes those elements but also includes other elements that are not expressly listed, or further includes elements inherent to such process, method, commodity, or device. In absence of more constraints, an element preceded by the statement "includes a . . . " does not preclude existence of identical elements in the process, method, commodity, or device that includes the element.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

The foregoing descriptions are only embodiments of this disclosure, but this disclosure is not limited to such embodiments. For a person skilled in the art, this disclosure may have various changes and variations. Any modification, equivalent replacement, and improvement made without departing from the spirit and principle of this disclosure shall fall within the protection scope of the claims of this disclosure.

The invention claimed is:

1. A pressure detection apparatus, wherein the pressure detection apparatus comprises a substrate, a light conducting layer, a light absorbing layer, and a photosensitive layer that are arranged in order, and further comprises a light source, wherein the light source is capable of emitting light of a first frequency, and an emergent surface of the light source faces toward the light conducting layer;

the light conducting layer disperses the light of the first frequency;

the light absorbing layer comprises a container forming a closed space and an absorption liquid filling the container, wherein the absorption liquid absorbs at least a part of the light of the first frequency, and at least one side surface of the container is an elastic surface; and a photosensitive surface of the photosensitive layer faces toward the light absorbing layer, and the photosensitive layer is used to detect the light of the first frequency that passes through the light absorbing layer;

wherein the absorption liquid is used to absorb the light of the first frequency, and has no absorption effect on visible light.

2. The pressure detection apparatus according to claim 1, wherein the light conducting layer comprises a reflective plate and a light guide plate, the reflective plate and the light guide plate are arranged in order, and the reflective plate is provided on a side surface of the substrate.

3. The pressure detection apparatus according to claim 2, wherein the light shielding layer is used to block light in a predetermined frequency range from passing through.

4. The pressure detection apparatus according to claim 3, wherein the light shielding layer comprises a base film and a reflection increasing film, a refractive index of the reflection increasing film is greater than that of the base film, a thickness of the reflection increasing film falls within a predetermined thickness range, the base film is provided above the photosensitive layer, and the reflection increasing film is provided above the base film.

5. The pressure detection apparatus according to claim 3, wherein a thickness of the reflection increasing film is an odd multiple of $$\frac{c}{4f_0 n_1};$$

wherein c is the speed of light in a vacuum, $f_0$ is the first frequency, $n_1$ is a refractive index of the infrared light in the reflection increasing film.

6. The pressure detection apparatus according to claim 1, further comprising a light shielding layer, wherein the light shielding layer is provided on a back side of a photosensitive surface of the photosensitive layer.

7. The pressure detection apparatus according to claim 1, further comprising a light processing assembly, wherein the light processing assembly comprises a refractive plate and a polarizing plate, and the refractive plate and the polarizing plate are adjacent to each other and are provided between the light conducting layer and the light absorbing layer.

8. The pressure detection apparatus according to claim 1, wherein a side surface of the container facing toward the light absorbing layer is an elastic surface, and a side surface of the container facing toward the light source is an inelastic surface.

9. The pressure detection apparatus according to claim 8, wherein a light transmittance of the container is higher than a predetermined light transmittance threshold.

10. The pressure detection apparatus according to claim 1, wherein an absorbed amount of the light of the first frequency by the absorption liquid is positively correlated with a distance that the light of the first frequency passes through the absorption liquid.

11. The pressure detection apparatus according to claim 1, wherein a detector and a plurality of photosensitive blocks are provided on the photosensitive layer, the plurality of photosensitive blocks are separately connected to the detector, the photosensitive block is configured to detect light intensity of the light of the first frequency and convert the detected light intensity into a current, and the detector is configured to determine, based on changes of the current, positions of the photosensitive blocks corresponding to light intensity changes.

12. A screen assembly, wherein the screen assembly comprises the pressure detection apparatus according to claim 1, the pressure detection apparatus comprises at least two light sources, and at least one of the at least two light sources is capable of emitting light of a first frequency.

13. The screen assembly according to claim 12, wherein the pressure detection apparatus comprises a first light source and a second light source, the first light source is configured to emit visible light, and the second light source is configured to emit invisible light of the first frequency.

14. A mobile terminal, wherein the mobile terminal comprises the screen assembly according to claim 13.

15. The screen assembly according to claim 12, wherein the light conducting layer comprises a reflective plate and a light guide plate, the reflective plate and the light guide plate are arranged in order, and the reflective plate is provided on a side surface of the substrate.

16. The screen assembly according to claim 12, further comprising a light shielding layer, wherein the light shielding layer is provided on a back side of a photosensitive surface of the photosensitive layer.

17. The screen assembly according to claim 12, further comprising a light processing assembly, wherein the light processing assembly comprises a refractive plate and a polarizing plate, and the refractive plate and the polarizing plate are adjacent to each other and are provided between the light conducting layer and the light absorbing layer.

18. The screen assembly according to claim 12, wherein a side surface of the container facing toward the light absorbing layer is an elastic surface, and a side surface of the container facing toward the light source is an inelastic surface.

19. The screen assembly according to claim 12, wherein an absorbed amount of the light of the first frequency by the absorption liquid is positively correlated with a distance that the light of the first frequency passes through the absorption liquid.

20. The screen assembly according to claim 12, wherein a detector and a plurality of photosensitive blocks are provided on the photosensitive layer, the plurality of photosensitive blocks are separately connected to the detector, the photosensitive block is configured to detect light intensity of the light of the first frequency and convert the detected light intensity into a current, and the detector is configured to determine, based on changes of the current, positions of the photosensitive blocks corresponding to light intensity changes.

* * * * *